(12) United States Patent
Dumpala et al.

(10) Patent No.: US 11,316,977 B2
(45) Date of Patent: Apr. 26, 2022

(54) SYSTEM AND METHOD FOR CALL ROUTING IN VOICE-BASED CALL CENTER

(71) Applicant: Tata Consultancy Services Limited, Mumbai (IN)

(72) Inventors: Sri Harsha Dumpala, Thane (IN); Sunil Kumar Kopparapu, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/026,891

(22) Filed: Jul. 3, 2018

(65) Prior Publication Data

US 2019/0132450 A1 May 2, 2019

(30) Foreign Application Priority Data

Oct. 27, 2017 (IN) .............................. 201721038213

(51) Int. Cl.
*H04M 3/00* (2006.01)
*H04M 5/00* (2006.01)
(Continued)

(52) U.S. Cl.
CPC ....... *H04M 3/5232* (2013.01); *H04M 3/5175* (2013.01); *H04M 3/5233* (2013.01); *H04M 2203/2038* (2013.01)

(58) Field of Classification Search
CPC ............. H04M 3/5232; H04M 3/5175; H04M 3/5191; H04M 3/5183; H04M 2203/402; H04M 3/523; H04M 3/5233; H04M 3/51; H04M 3/5166; H04M 2203/556; H04M 3/5235; H04M 2203/401; G06Q 10/06311; G06Q 10/06398; G06Q 30/0202; G06Q 10/06375; G06Q 10/04; G06Q 10/06315; G06Q 10/0639; G06Q 10/06393; G06Q 10/063112; H04L 63/0861; H04L 67/22;
(Continued)

(56) References Cited

U.S. PATENT DOCUMENTS 7,027,621 B1 * 4/2006 Prokoski ............ G06K 9/00248
180/272
8,512,240 B1 * 8/2013 Zuckerman-Stark ........................
G16H 50/30
600/301
(Continued)

FOREIGN PATENT DOCUMENTS

CN 103445793 A 12/2013
RU 2441585 C1 2/2012

*Primary Examiner* — Kharye Pope
(74) *Attorney, Agent, or Firm* — Finnegan, Henderson, Farabow, Garrett & Dunner, LLP

(57) ABSTRACT

A system and method for monitoring behavior of voice agents in a simulated environment of voice-based call center to route a call. It includes a set of models and wearable devices to estimate and analyze cognitive load and emotional state of a voice agent which are obtained using wearable devices in the real time. It collects physiological signals from the voice agents and analyze them along with skill-set profiles of the voice agent to identify best suited voice agent based on agent-customer matching score obtained using skill-set profile analysis, cognitive load and a predicted emotive state of the voice agent. It may assist the voice agent in call if the cognitive load of the voice agent raises beyond predefined threshold using brain computer interfacing.

6 Claims, 4 Drawing Sheets

(51) Int. Cl.
*H04L 12/66* (2006.01)
*H04M 3/523* (2006.01)
*H04M 3/51* (2006.01)

(58) Field of Classification Search
CPC ... H04L 67/306; H04L 63/0876; H04L 51/04; H04L 9/3231; H04L 41/22; H04L 43/16; G06F 21/32; G06F 3/011; G06F 17/5009; G06F 21/316; G06F 19/3418; G06F 3/013; G06F 3/015; G06F 16/636; G06F 19/30; G06F 1/163
USPC .............. 379/265.06, 265.11, 265.02, 265.1, 379/265.01, 265.12, 266.01, 265.03, 379/265.05, 265.13, 265.14, 266.08; 370/352, 354; 705/7.31, 7.38
See application file for complete search history.

(56) References Cited

U.S. PATENT DOCUMENTS

| | | | | |
|---|---|---|---|---|
| 2002/0184069 A1* | 12/2002 | Kosiba | ................... | G06Q 10/04 705/7.38 |
| 2004/0264672 A1* | 12/2004 | Paek | ..................... | H04M 3/527 379/221.03 |
| 2007/0121824 A1* | 5/2007 | Agapi | ................. | H04M 3/5175 379/88.18 |
| 2010/0158238 A1* | 6/2010 | Saushkin | ............... | G06Q 10/06 379/265.12 |
| 2011/0150189 A1* | 6/2011 | Kulkarni | ............... | H04M 3/323 379/32.01 |
| 2011/0178978 A1 | 7/2011 | Parunak et al. | | |
| 2011/0238685 A1* | 9/2011 | Garcia Molina | ........ | G06F 3/015 707/769 |
| 2014/0140497 A1* | 5/2014 | Ripa | ................... | H04M 3/5133 379/265.06 |
| 2014/0220526 A1* | 8/2014 | Sylves | ............... | G06Q 30/0201 434/238 |
| 2015/0206090 A1* | 7/2015 | Pakhchanyan | ...... | G06F 3/04895 705/7.42 |
| 2016/0071393 A1* | 3/2016 | Kaplan | ................ | A61B 5/6831 340/539.12 |
| 2016/0157776 A1* | 6/2016 | Mestha | .............. | A61B 5/02427 600/479 |
| 2016/0174843 A1* | 6/2016 | Falconer | .............. | A61B 5/7221 600/328 |
| 2016/0239780 A1* | 8/2016 | Liljenquist | ....... | G06Q 10/06393 |
| 2016/0267405 A1 | 9/2016 | Reiner | | |
| 2017/0188848 A1* | 7/2017 | Banet | ................... | A61B 5/0537 |
| 2017/0316707 A1* | 11/2017 | Lawrenson | .......... | A61B 5/7475 |
| 2018/0110460 A1* | 4/2018 | Danson | ................. | G16H 50/30 |
| 2020/0265942 A1* | 8/2020 | Bruno | ................... | G16H 20/70 |

* cited by examiner

SYSTEM AND METHOD FOR CALL ROUTING IN VOICE-BASED CALL CENTER

PRIORITY CLAIM

This U.S. patent application claims priority under 35 U.S.C. § 119 to India Application No. 201721038213, filed on Oct. 27, 2017. The entire contents of the abovementioned application are incorporated herein by reference.

TECHNICAL FIELD

The embodiments herein generally relates to a system and method for real time call routing in voice-based call center and, more particularly, recommending a comprehensive framework to monitor behavior of one or more voice agents in a simulated environment of voice-based call center to route a call.

BACKGROUND

Today most of voice-based call centers route their customers' calls to a voice agent based on the static skill-set of the voice agent such as the level of expertise, language fluency etc. This is to make sure that the customer is put in contact with the best possible voice agent so that the customer is satisfied at the end of the conversation. In some existing approaches for routing calls in the voice-based call centers, the emotional state of the customer is also considered for forwarding the call to a voice agent in the voice-based call center.

Only a few approaches have considered the emotional state of the voice agent in addition to the skill-set of the voice agent in forwarding the voice calls in the voice-based call center. In these approaches, the emotional state of the voice agent is estimated based on the speech, vision and other information collected from the voice agent during handling a call. The collected information is used as a metric in addition to the skill-set of the voice agent in making a decision of forwarding the call. Often, the decision obtained from these inputs can be deceiving as the voice agent tries to be polite to the customer even after being subdued to a huge stress. This will definitely effect the performance of the voice agent and thus, the credibility and revenue of the voice-based call center as a whole. Further, it may dampen the performance of the voice agent, even though the voice agent has very good skills in handling the calls.

Hence, reliable estimation of the cognitive load and emotional state of the voice agent prior to call forwarding and using the same in deciding the call forwarding process is essential for both, the customer and the voice agent.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system and method for monitoring behavior of one or more voice agents in a simulated environment of voice-based call center to route a telephonic communication.

In one aspect, a system for monitoring behavior of one or more voice agents in a simulated environment of the voice-based call center to route a call. The system comprises a plurality of interfacing module, a processor, a memory communicatively coupled to the processor and the memory contains instructions that are readable by the processor, a plurality of wearable devices, wherein the wearable devices includes EEG, sweat sensor, speech and body analyzer, heart beat analyzer. The system is configured to receive one or more requests from one or more customers to have a call to a voice agent and to collect one or more physiological signals from the one or more voice agents in the simulated environment of the voice-based call center using wearable devices. Further, the system analyzes skill-set profile of each voice agent in the simulated environment of voice-based call center using the static voice agent model and the dynamic voice agent model, wherein the static voice agent model provides the static skill-set profile of the voice agent such as qualification of the voice agent and efficiency in handling a call and customer satisfaction etc., and the dynamic voice agent model provides the dynamic skill-set profile of the voice agent which refers to the cognitive load observed by the voice agent in simulated environment of voice-based call center while handling different category of calls. Furthermore, the system analyzes emotive state and cognitive load of each voice agent based on the voice agents physiological signals in the simulated environment of voice-based call center using emotion prediction model and cognitive load analysis model, respectively. Finally identifies at-least one voice agent of the one or more voice agents based on an agent-customer matching score obtained using the skill-set profile analysis, cognitive load and the predicted emotive state of the at least one voice agent.

In another aspect, a method for monitoring behavior of one or more voice agents in a simulated environment of voice-based call center to route a call. The method comprises receiving one or more requests from one or more customers to have a call to a voice agent, collecting one or more physiological signals from the one or more voice agents in the simulated environment of voice-based call center using wearable devices, analyzing skill-set profiles of each voice agent in the simulated environment of voice-based call center using the static voice agent model and the dynamic voice agent model. Further, the skill-set profile provides details about the qualification of the voice agent, efficiency in handling a call, customer satisfaction, and the cognitive load laid on the voice agent while handling different category of calls, assessing the cognitive load of each voice agent in the simulated environment of voice-based call center using cognitive load analysis model, wherein the physiological signals from each voice agent is analyzed, analyzing emotive state of each voice agent based on the voice agents physiological signals of the one or more voice agents in the simulated environment of voice-based call center using emotion prediction model and identifying at least one voice agent of the one or more voice agents based on an agent-customer matching score obtained using the skill-set profile analysis, cognitive load and a predicted emotive state of the at least one voice agent.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
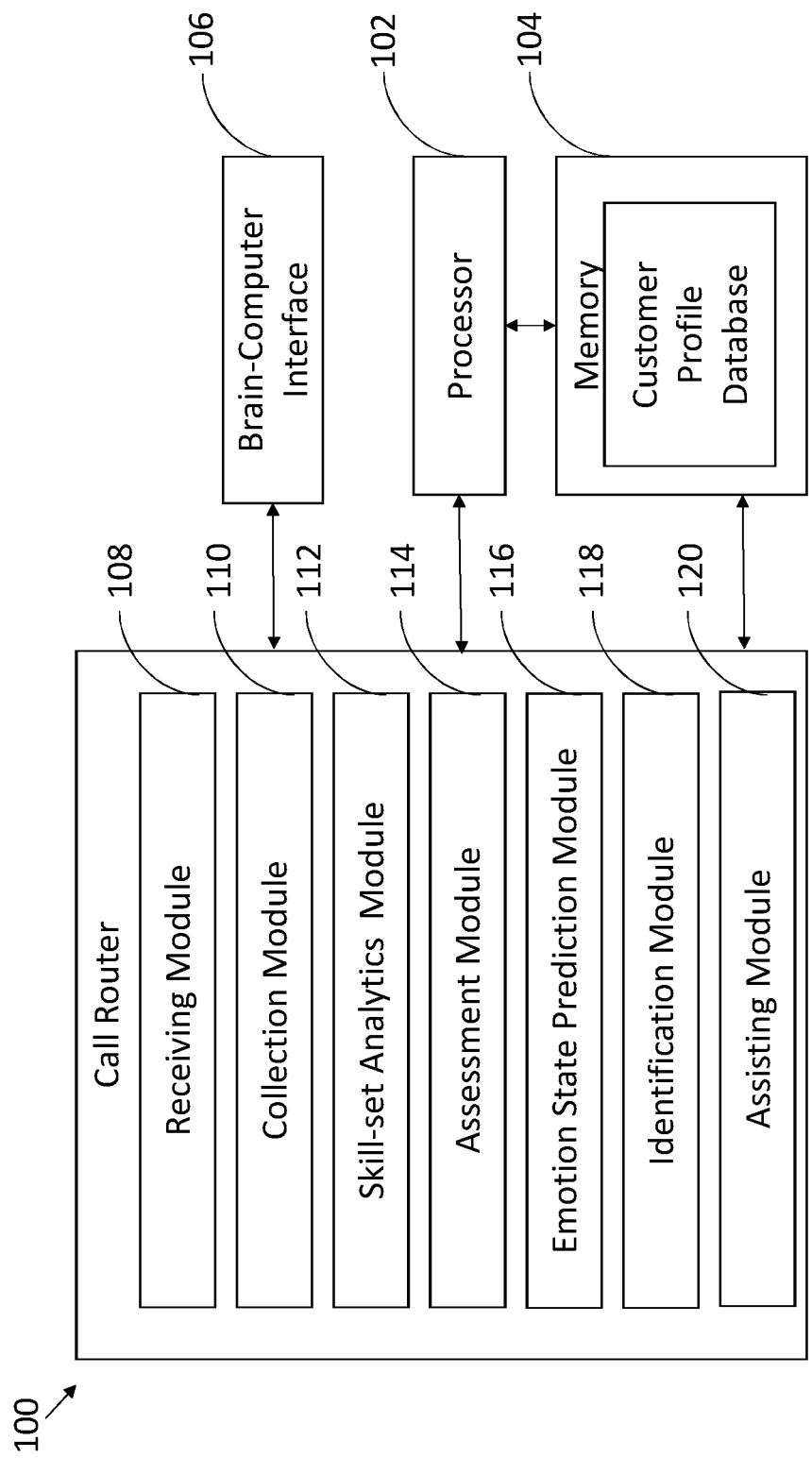
FIG. 1 illustrates a system for monitoring behavior of one or more voice agents in a simulated environment of voice-based call center to route a call according to an embodiment of the present disclosure.

Referring to FIG. 1, a system 100 for monitoring behavior of one or more voice agents in a simulated environment of voice-based call center to route a telephonic communication. The system 100 comprising a processor 102, a memory 104 communicatively coupled to the processor 102, a brain-computer interfacing module 106, a receiving module 108, a collection module 110, a skill-set analytics module 112, an assessment module 114, an emotive state prediction module 116, an identification module 118 and an assisting module 120.

In the preferred embodiment, the memory 104 contains instructions that are readable by the processor 102.

In the preferred embodiment, the receiving module 108 is configured to receive one or more requests from one or more customers to have a call to a voice agent. The customer's request the call centers for assistance in different sectors such as banking, financial, cellular, technical support etc.

In the preferred embodiment, the collection module 110 is configured to collect one or more physiological signals from the one or more voice agents in the simulated environment of voice-based call center using wearable devices. The collected physiological signals are analyzed by cognitive load analysis model, and the emotion prediction model. The emotive state of the voice agent, and the cognitive load on the voice agent, which are monitored continuously, while the voice agent is attending different types of calls in a particular domain in which the voice agent is an expert are considered. The type of calls for which the cognitive load on the voice agent is constantly higher than a predefined level are recorded. This recorded information is used to identify problematic call types in the specific domain for a voice agent who have skills in that domain. This information is used to build the dynamic voice agent models.

For instance, a voice agent working in banking sector have to attend calls related to different categories such as loans, credit cards, debit cards, account handling etc. Within each category, there will be further subcategories. Thus, this voice agent might face very less cognitive load to handle calls related to loan issuance and loan recovery but suffer from a high cognitive load than usual while handling calls related to interest on loans. Similarly, the voice agent may be able to interact with old customers with ease but feel too nervous to interact with new customers. Using the estimated cognitive load and the predicted emotive state of the agent, while attending calls related to these different categories and sub-categories, the dynamic voice agent models are built for each voice agent.

In the preferred embodiment, the skill-set analytics module 112 is configured to analyze skill-set profile of each voice agent in the simulated environment of voice-based call center. The skill-set profile of each voice agent includes static skill-set profiles and dynamic skill-set profiles. The static skill-set profile provides details of the voice agent such as qualification of the voice agent and efficiency in handling a call and customer satisfaction etc. The dynamic skill-set profile for each voice agent is built in real time based on the cognitive score of the voice agent, estimated using physiological signals, previously observed during one or more different categories of calls. Further, the dynamic skill-set profile of the voice agent is updated after every call attended by the voice agent.

In the preferred embodiment, the assessment module 114 is configured for assessment of cognitive load of each voice agent in the simulated environment of voice-based call center using cognitive load analysis model. The cognitive load analysis models are developed for each voice agent based on one or more different types of calls with the customers. The cognitive load analysis models are used to define threshold used on the cognitive load of each voice agent.

In the preferred embodiment, the emotive state analysis module 116 is configured to analyze emotive state of each voice agent based on the voice agents' physiological signal in the simulated environment of voice-based call center using emotion prediction model. The physiological signals collected from the voice agent using different wearable devices are analyzed to develop a voice agent specific emotion analysis model, which can estimate the emotive state of the speaker in real time at any given instant of time.

In the preferred embodiment, the identification module 118 is configured to identify at least one voice agent based on the agent-customer matching score obtained based on the skill-set profile analysis, cognitive load and a predicted emotive state of each voice agent in the simulated environment of voice-based call center.

In the preferred embodiment, the assisting module 120 is configured to assist each voice agent in call if the cognitive load of the voice agent raises beyond predefined threshold using brain-computer interfacing (BCI). While attending the call, if the cognitive load of the voice agent raises above the predefined threshold level for a significant amount of time, then assistance is provided in the tasks which lay more cognitive load on the voice agent. For instance, if the cognitive load laid on the voice agent is higher when the voice agent is typing, then using BCI assistance is provided to the voice agent in typing. This will help voice agent to concentrate on the customer with a lower cognitive load.

Figure 2:
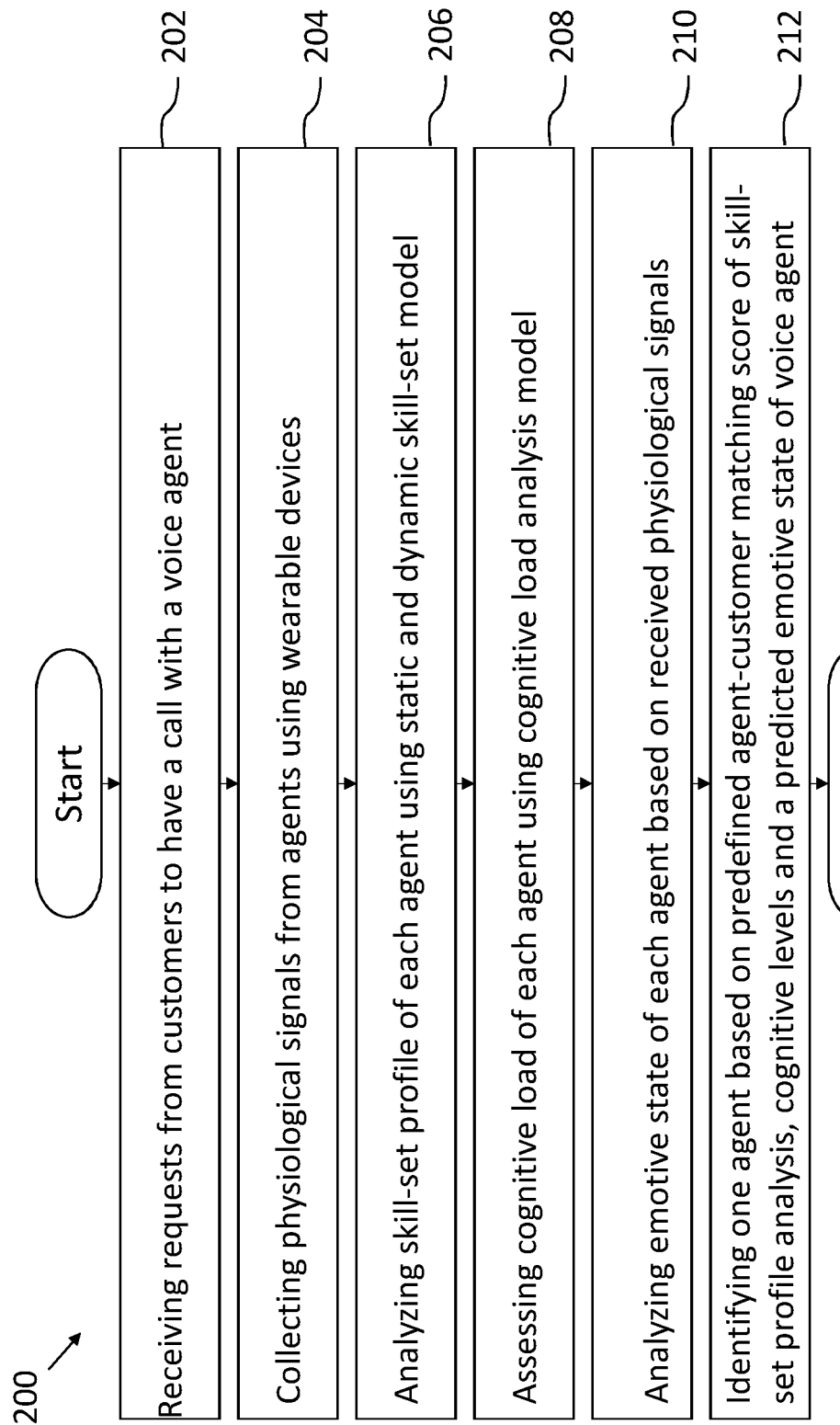
FIG. 2 illustrates a method for monitoring behavior of one or more voice agents in a simulated environment of voice-based call center to route a call according to an embodiment of the present disclosure.

Referring FIG. 2, a method 200 for monitoring behavior of one or more voice agents in a simulated environment of voice-based call center to route a call.

At step 202, where the process receives one or more requests from one or more customers to have a telephonic communication with voice agent. The customer's request the call centers for assistance in different sectors such as banking, financial, cellular, tech support etc.

At step 204, where the process collecting one or more physiological signals from the one or more voice agents in the simulated environment of voice-based call center using wearable devices. The collected physiological signals are analyzed by cognitive load analysis model, and the emotion prediction model. The emotive state of the voice agent, and the cognitive load on the voice agent, which are monitored continuously, while the voice agent is attending different types of calls in a particular domain in which the voice agent is an expert are considered. The type of calls for which the cognitive load on the voice agent is constantly higher than a predefined level are recorded. This recorded information is used to identify problematic call types in the specific domain for a voice agent who have skills in that domain. This information is used to build the dynamic voice agent models.

At step 206, where the process analyzing skill-set profile of each voice agent in the simulated environment of voice-based call center using skill-set analytics module. The skill-set profile of each voice agent includes static skill-set profiles and dynamic skill-set profiles. The static skill-set profile provides details of the voice agent such as qualification of the voice agent and efficiency in handling a call and customer satisfaction etc. The dynamic skill-set profile for each voice agent is built in real time based on the cognitive score of the voice agent, estimated using physiological signals, previously observed during one or more different categories of calls. Further, the dynamic skill-set profile of the voice agent is updated after every call attended by the voice agent At step 208, where the process assessing cognitive load of each voice agent of the one or more voice agents in the simulated environment of voice-based call center using cognitive load analysis model, wherein the physiological signals from each voice agent is analyzed. The cognitive load analysis models are developed for each voice agent based on one or more different types of calls with the customers. The cognitive load analysis models are used to define threshold used on cognitive load of each voice agent.

At step 210, where the process analyzing emotive state of each voice agent based on the voice agents physiological signals of the one or more voice agents in the simulated environment of voice-based call center using emotion prediction model. The physiological signals collected from the voice agent using different wearable devices are analyzed to develop a voice agent specific emotion analysis model, which can estimate the emotive state of the speaker in real time at any given instant of time.

At final step 212, where the process identifying at least one voice agent of the one or more voice agents based on the agent-customer matching score obtained based on skill-set profile analysis, cognitive load and a predicted emotive state of the at least one voice agent.

Figure 3:
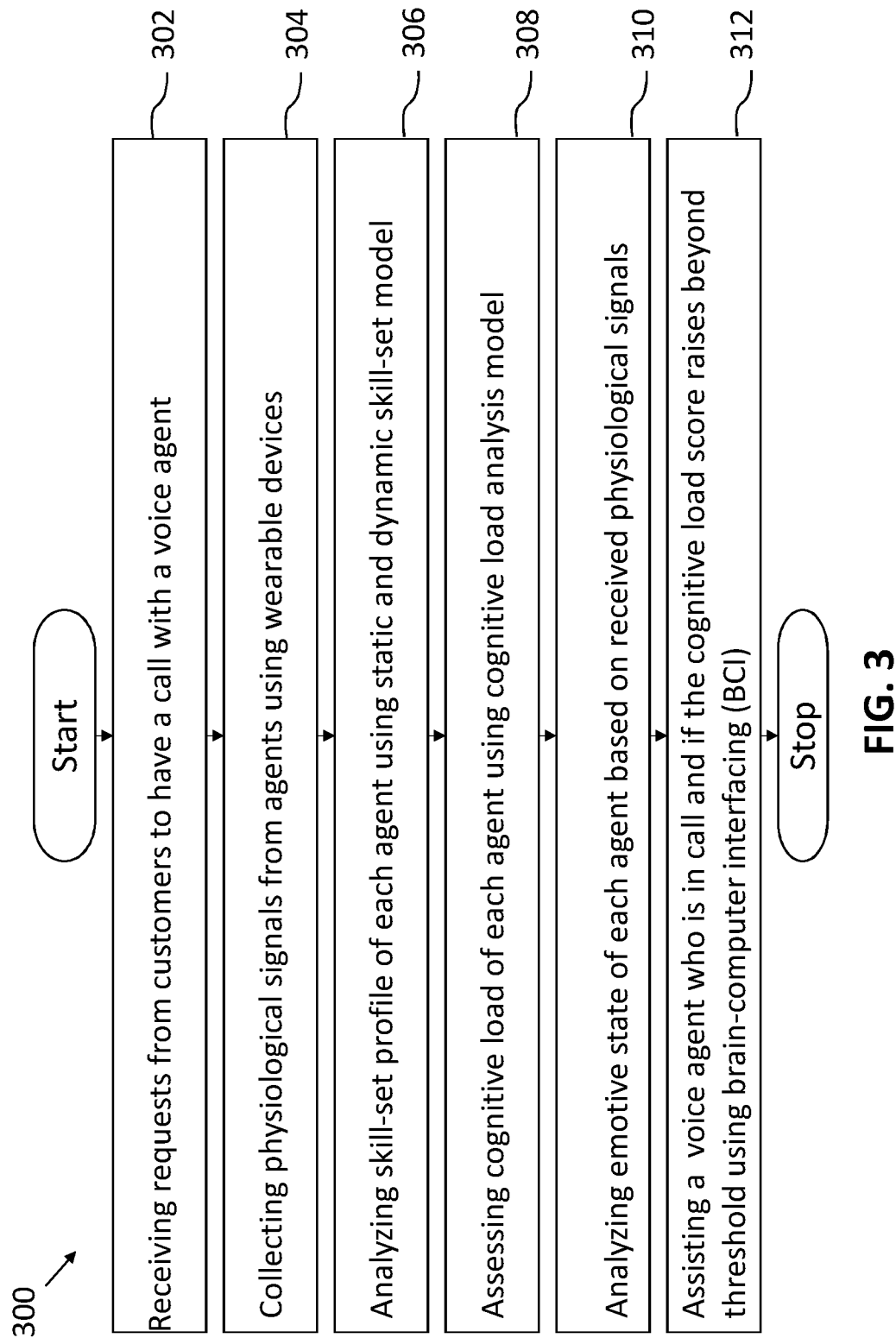
FIG. 3 illustrates a method for providing brain-computer interfacing (BCI) based assistance to a voice agent at a voice-based call center according to an embodiment of the present disclosure.

Referring FIG. 3, a method 300 for assisting a voice agent in the call, if the cognitive load s raises beyond predefined threshold, using brain-computer interfacing module.

At step 302, where the process receives one or more requests from one or more customers to have a telephonic communication with voice agent.

At step 304, where the process collecting one or more physiological signals from the one or more voice agents in the simulated environment of voice-based call center using wearable devices.

At step 306, where the process analyzing skill-set profile of each voice agent in the simulated environment of voice-based call center using skill-set analytics module.

At step 308, where the process assessing cognitive load of each voice agent of the one or more voice agents in the simulated environment of voice-based call center using cognitive load analysis model, wherein the physiological signals from each voice agent is analyzed.

At step 310, where the process analyzing emotive state of each voice agent based on the voice agents physiological signals of the one or more voice agents in the simulated environment of voice-based call center using emotion prediction model.

At final step 312, where the process assists a voice agent in the call, if the cognitive load raises beyond predefined threshold, using brain-computer interfacing (BCI) module.

In one embodiment, where the voice agent is in call and the cognitive load of the voice agent is continuously tracked during the call. When the cognitive load of the voice agent exceeds than the predefined threshold then the BCI based assistance is provided to the voice agent.

Figure 4:
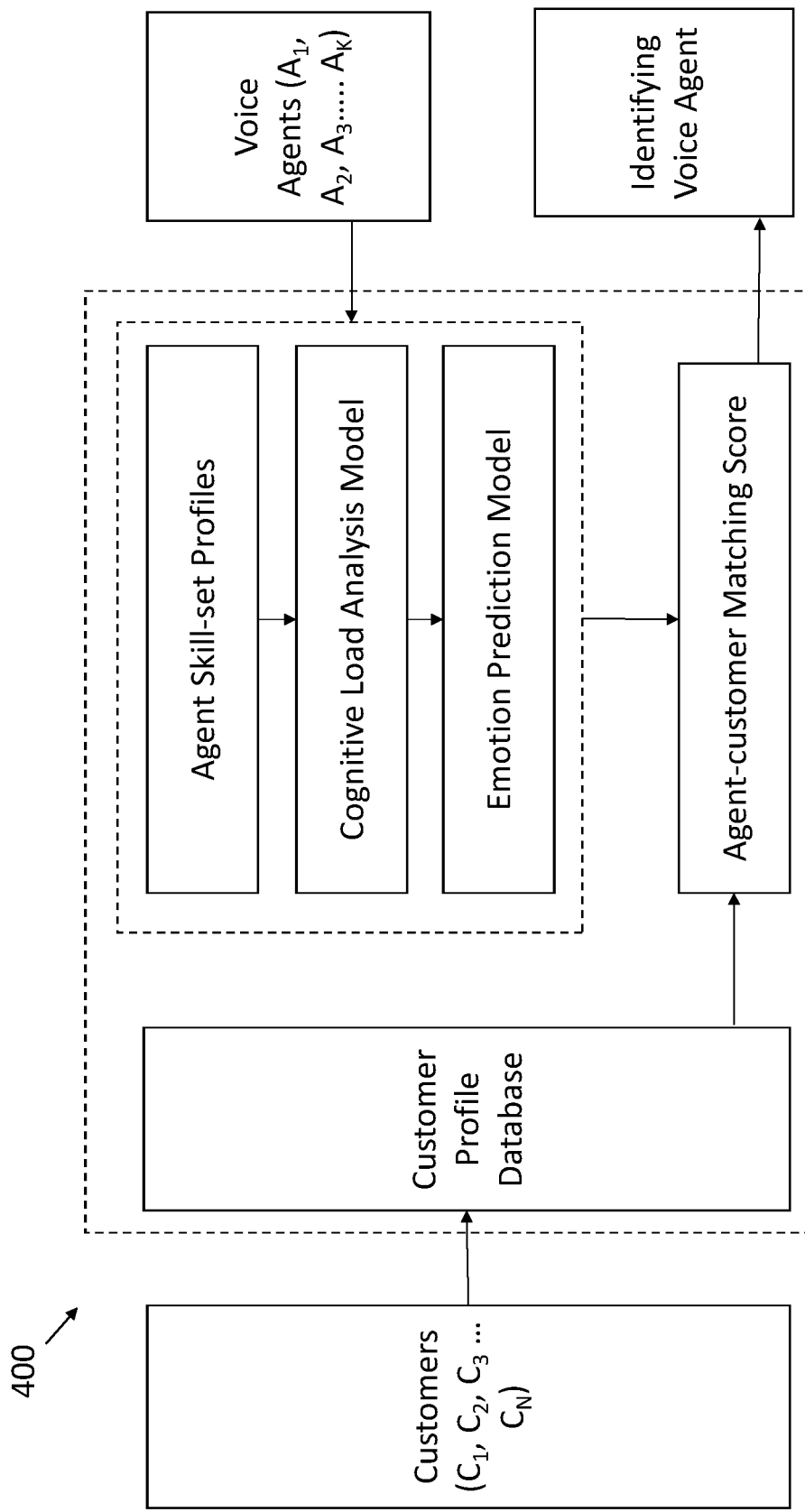
FIG. 4 illustrates schematic diagram to identify a suitable voice agent from one or more voice agents in a simulated environment of voice-based call center to route a call according to an embodiment of the present disclosure.

In an example, if there are N customers and there are K agents (usually N is very large compared to K) as shown in FIG. 4. The call flow process starts when one or more customers (C1, C2, C3 . . . CN) calls the voice-based call center and needs to talk to an agent of the center. The call router first gets the customers profile from its database. The router finds the list of agents who are not in call from the set of K agents (A1, A2, A3 . . . AK). Further, the router analyze the agent skill-set profile based on the static and dynamic skill-set profile of the agent. Static agent model of the router provides the static skill-set profile of the agent such as qualification of the agent and efficiency in handling a call and customer satisfaction etc. The dynamic agent model of the router provides the dynamic skill-set profile of the agent which refers to the cognitive load previously observed by the agent while handling different category of calls. Further, the call router collects the physiological signals from agents using various wearable device in the simulated environment. The collected physiological signals are analyzed to compute the current cognitive load of the agent using the cognitive load analysis model. In addition to, the call router predicts the current emotive state of the agent by the emotion prediction model using the collected physiological signals. All this leads to match the customer profile with the details of agent to obtain the agent-customer matching score, and forward the call to the identified agent who forms the best pair with the customer.

In another embodiment, where the call router continuously monitors the cognitive load of the agent using the cognitive load analysis model. If the agent is in call and the cognitive load raises beyond a threshold level, the system provides BCI-based assistance to the voice agent. Further, wherein if the cognitive load of the voice agent again drops below the threshold. At this instant, the BCI based assistance is slowly withdrawn.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

A system and method provide a comprehensive framework to monitor behavior of voice agents in a simulated environment of voice-based call center to route a call from one voice agent to another. It includes a set of models and wearable devices to estimate and analyze cognitive load and emotional state of voice agent which are obtained using wearable devices in the real time. It collects physiological signals from the voice agents and analyze them along with skill-set profiles of the voice agent to identify best suited voice agent based on score obtained using skill-set profile analysis, cognitive load and a predicted emotive state of the voice agent. The system may assist the voice agent in telephonic communication if the cognitive load of the voice agent raises beyond predefined threshold using brain-computer interfacing.

The embodiments of present disclosure herein addresses unresolved problem of estimation of the cognitive load and emotive state of the speaker, from the physiological signals collected in real time using wearable devices, for use in forwarding calls to voice agents in voice-based call centers. Further, the existing system needs the estimated cognitive load and emotive states of the voice agents, while handling different category of calls, to build dynamic skill-set profiles specific to the voice agent.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A method for monitoring behavior of one or more voice agents in a simulated environment of voice-based call center to route a call, wherein the method comprising:
receiving one or more requests from one or more customers to have a call with a voice agent in a simulated environment of voice-based call center;
collecting one or more physiological signals from the one or more voice agents in the simulated environment of voice-based call center using wearable devices;
analyzing a skill-set profile of each voice agent using a static skill-set model and a dynamic skill-set model, wherein the static skill-set model provides the static skill-set profile of the voice agent and the dynamic skill-set model represents the dynamic skill-set profile of the voice agent, wherein the static skill-set profile of voice agent includes a qualification of the voice agent, efficiency in handling a call and customer satisfaction, wherein the dynamic skill-set profile for each voice agent is built in real time based on the cognitive load of the voice agent at that point of time based on physiological signal collected using wearable devices and also the performance of the voice agent previously observed during one or more different category of calls, wherein the one or more different category of calls for which the cognitive load on the voice agent is constantly higher than a predefined level are recorded and the recorded information identify problematic call types in a domain for the voice agent with skills in the domain and builds the dynamic skill-set model, and wherein the dynamic skill-set profile of the voice agent is updated after every call attended by the voice agent;

assessing cognitive load of each voice agent of the one or more voice agents in the simulated environment of voice-based call center using cognitive load analysis model, wherein the physiological signals from each voice agent is analyzed;

analyzing emotive state of each voice agent based on the voice agents physiological signals of the one or more voice agents in the simulated environment of voice-based call center using emotion prediction model;

identifying at least one voice agent of the one or more voice agents based on an agent-customer matching score computed from skill-set profile analysis, cognitive load and a predicted emotive state of the at least one voice agent and forward call to the identified at least one agent who forms the best pair with the customer; and monitoring of cognitive load of each voice agent constantly during a telephonic communication, and assisting each voice agent of the one or more voice agents in call if the cognitive load of the voice agent raises beyond predefined threshold using brain-computer interfacing (BCI) and withdrawing the BCI based assistance if the cognitive load of the voice agent again drops below the predetermined threshold.

2. The method claimed in claim 1, wherein the cognitive load analysis models are developed for each voice agent based on one or more different types of calls with the voice agent.

3. The method claimed in claim 2, wherein the cognitive load analysis models are used to define the threshold used on cognitive load for each voice agent.

4. A system for monitoring behavior of one or more voice agents in a simulated environment of voice-based call center to route a telephonic communication, wherein the system comprising:
   a memory with a plurality of instructions;
   a plurality of wearable devices, wherein the wearable devices includes Electroencephalogram, sweat sensor, speech and body analyzer, and heart beat analyzer;
   a plurality of interfacing modules;
   a processors communicatively coupled with memory, wherein the processors is configured to execute one or more steps of:
   receiving, at a receiver module, one or more requests from one or more customers to have a telephonic communication to an voice agent;
   collecting, at a collection module, one or more physiological signals from the one or more voice agents in the simulated environment of voice-based call center using wearable devices;
   analyzing a skill-set profile of each voice agent using a static skill-set model and a dynamic skill-set model, wherein the static skill-set model provides the static skill-set profile of the voice agent and the dynamic skill-set model represents the dynamic skill-set profile of the voice agent, wherein the static skill-set profile of voice agent includes a qualification of the voice agent, efficiency in handling a call and customer satisfaction, wherein the dynamic skill-set profile for each voice agent is built in real time based on the cognitive load of the voice agent at that point of time based on physiological signal collected using wearable devices and also the performance of the voice agent previously observed during one or more different category of calls, wherein the one or more different category of calls for which the cognitive load on the voice agent is constantly higher than a predefined level are recorded and the recorded information identify problematic call types in a domain for the voice agent with skills in the domain and builds the dynamic skill-set model, and wherein the dynamic skill-set profile of the voice agent is updated after every call attended by the voice agent;
   assessing, an assessment module, cognitive load of each voice agent of the one or more voice agents in the simulated environment of voice-based call center using cognitive load analysis model, wherein the physiological signals collected from each voice agent is analyzed;
   analyzing, emotive state analysis module, emotive state of each voice agent based on the voice agents physiological signal of the one or more voice agents in the simulated environment of voice-based call center using emotion prediction model;
   identifying, an identifier module, at-least one voice agent of the one or more voice agents based on an agent-customer matching score obtained using skill-set profile analysis, cognitive load and a predicted emotive state of the at least one voice agent and forward call to the identified at least one agent who forms the best pair with the customer; and
   monitoring, cognitive load of each voice agent constantly during a telephonic communication, and assisting, an assisting module to each voice agent of the one or more voice agents in telephonic communication if the cognitive load of the voice agent raises beyond predefined threshold using brain-computer interfacing (BCI) and withdrawing the BCI based assistance if the cognitive load of the voice agent again drops below the predetermined threshold.

5. The system claimed in claim 4, wherein the cognitive load analysis models are developed for each voice agent based on one or more different types of calls with the voice agent.

6. The system claimed in claim 5, wherein the cognitive load analysis models are used to define the threshold used on cognitive load for each voice agent.

* * * * *